United States Patent [19]
Svensson

[11] Patent Number: 5,527,066
[45] Date of Patent: Jun. 18, 1996

[54] AIRBAG FILLING ARRANGEMENT

[75] Inventor: Orvar Svensson, Täby, Sweden

[73] Assignee: AGA Aktiebolag, Lidingo, Sweden

[21] Appl. No.: 244,770

[22] PCT Filed: Sep. 18, 1992

[86] PCT No.: PCT/SE92/00639

§ 371 Date: Jun. 9, 1994

§ 102(e) Date: Jun. 9, 1994

[87] PCT Pub. No.: WO93/11971

PCT Pub. Date: Jun. 24, 1993

[30] Foreign Application Priority Data

Dec. 10, 1991 [SE] Sweden .................................. 9103649

[51] Int. Cl.⁶ .................................................. B60R 21/26
[52] U.S. Cl. .............................................. 280/737; 280/741
[58] Field of Search ..................................... 280/736, 737, 280/741; 102/530, 531; 422/305

[56] References Cited

U.S. PATENT DOCUMENTS

| | | | |
|---|---|---|---|
| 3,680,886 | 8/1972 | Mazelsky | 280/740 |
| 3,756,621 | 9/1973 | Lewis et al. | 280/741 |
| 3,868,124 | 2/1975 | Johnson | 280/737 |
| 4,822,895 | 7/1974 | Ochiai | 280/737 |
| 5,348,344 | 9/1994 | Blumenthal, et al. | 280/737 |

FOREIGN PATENT DOCUMENTS

| | | |
|---|---|---|
| 2061759 | 7/1971 | Germany . |
| 2253303 | 5/1973 | Germany . |
| 2344517 | 3/1974 | Germany . |
| 2501602 | 7/1975 | Germany . |
| 4231356A1 | 4/1993 | Germany . |
| WO91/15381 | 10/1991 | WIPO . |

*Primary Examiner*—Paul N. Dickson
*Attorney, Agent, or Firm*—Calfee, Halter & Griswold

[57] ABSTRACT

The present invention relates to an arrangement for filling a flexible container with gas essentially instantaneously upon the occurrence of powerful retardation forces, wherein the gas-filled container functions as a force-absorbing cushion for protection against injury. The arrangement includes a gas-filled high-pressure vessel, a conduit which connects the pressure vessel to the container, a mechanical opening device for opening the connection between the vessel and the container upon the occurrence of a retardation force which exceeds a smallest value, and a retardation meter. The arrangement is characterized in that the vessel is filled with a gas which exhibits a reversed Joule-Thomson effect.

4 Claims, 1 Drawing Sheet

AIRBAG FILLING ARRANGEMENT

TECHNICAL FIELD

The present invention relates to an arrangement for filling an empty flexible container essentially instantaneously with a gas when the speed of an automotive vehicle in which the container is installed is greatly and abruptly retarded, wherein the container is intended to prevent injury to person or persons present in the vehicle, or to reduce the extent of the injury sustained in the event of a collision for instance.

BACKGROUND OF THE INVENTION

Certain cars are equipped with so-called airbags as an alternative or as a supplement to standard vehicle safety harnesses. These bags are swiftly inflated in front of the driver or passengers of the vehicle in the event of a collision, so as to shield the driver or passengers from such injuries as those which might be inflicted when thrown forwards against the steering wheel or the instrument panel.

Hitherto, vehicles have not been equipped with airbags for backseat passengers. The reason is possibly because backseat passengers would require much larger bags, which is probably associated with a number of problems which can be related purely to gas kinetics.

In the event of a head-on collision, or any other collision, in which the vehicle is stopped very quickly, it is necessary for the container to be inflated with gas and form an airbag or a gas cushion before the person is thrown forward against the backrest of the front seat or against the steering wheel/or the instrument panel at the initial speed of the vehicle.

In order to obtain effective protection, it is estimated that the airbag must be inflated within one-hundredth of a second.

Assuming that a car is travelling at a speed of 110 km/hour when a collision occurs, a person seated in the car will be moved through a distance of about 0.3 meter in relation to the ground in this time. Since the actual body of the vehicle will not stop instantaneously, owing to the fact that the front of the vehicle is buckled-in through a distance of one or more decimeters, the driver or passengers of the vehicle have time to move about one to two decimeters relative to the vehicle body in 0.01 seconds, which means that the airbag has time to inflate and to prevent the driver or passengers being thrown onto the driving wheel, the instrument panel or the backrest of the seat in front.

A device for filling a flexible container (airbag) essentially instantaneously with gas upon the occurrence of powerful retardation forces is known from DE-A1-2061759. The device comprises a flexible container to be filled with gas, an elongated pressurized vessel containing a gas, e. g. nitrogen or helium, a channel connecting the flexible container with the pressurized vessel and an explosive charge arranged to open the channel between the vessel and the container when the container is to be inflated. This reference mentions a suitable gases nitrogen and helium, both being preferred among other gases in general.

When a gas, which in case of nitrogen expands without the exchange of energy (iso-enthalpy), the temperature will normally fall in accordance with the so-called Joule-Thomson effect.

In the case of air or nitrogen, which is permitted to expand from 400 to 2 bars, the temperature will fall by about 70 to 100 degrees. When, as in the case of airbags, the gas is stored in high pressure containers, it is either necessary to supply corresponding heat to the gas so as to obtain the volume that would be obtained at room temperature, or the pressure container must be filled with about 30% more gas.

In addition to this drop in temperature, it must be remembered that air, nitrogen and other gases have a compressibility factor of about 1.2 at 400 bars, which must be taken into account when dimensioning the container, since otherwise the pressure or the volume must be increased to a corresponding degree in accordance with the case of an ideal gas.

Another problem associated with all heavy gases is that, in the present case, the outflow velocity of the gas would be relatively low, since this gas velocity is a function of both molecular weight and temperature.

SUMMARY OF THE INVENTION

One object of the present invention is to provide apparatus for filling an empty, flexible container with gas essentially instantaneously in the event of an abrupt retardation in the speed of an automotive vehicle, said gas-filled container functioning as a force-absorbing cushion so as to reduce the extent of the injuries that may be sustained. The arrangement includes a gas-filled pressure vessel 12 under high pressure, a conduit 14 which connects the pressure vessel to the container, a mechanical opening device 16 for opening the connection between the vessel and the container when retardation exceeds a smallest value, and a retardation meter 18.

BRIEF DESCRIPTION OF THE DRAWING

The sole FIGURE is a schematic representation of the present invention attached to an airbag, designated as "C" for container.

DESCRIPTION OF THE INVENTION

Figure 1:
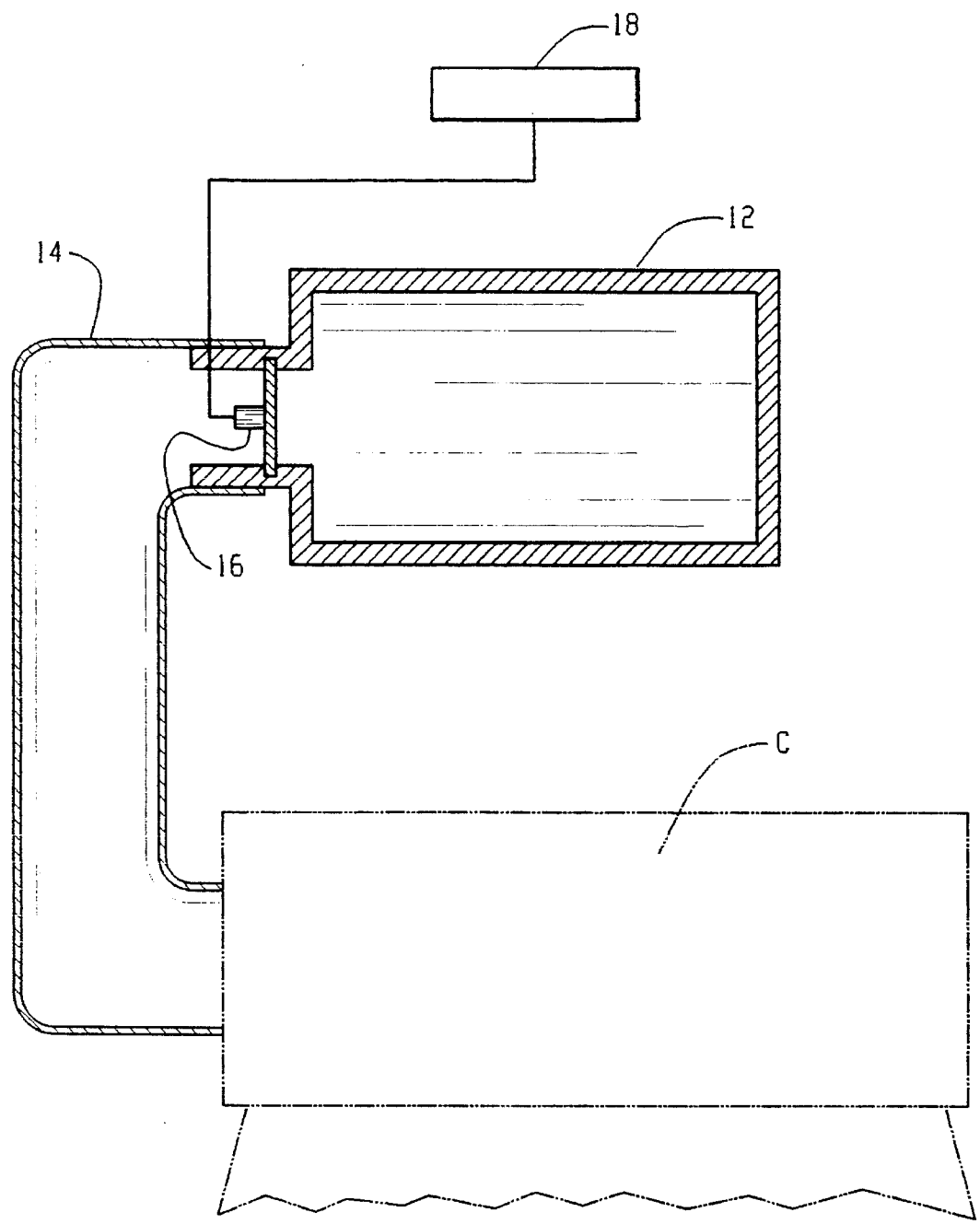

This object is realized in accordance with the invention with an arrangement having the characteristic features set forth in the main Claim. Advantageous further developments of the inventive arrangement are set forth in the depending Claims.

Gases which exhibit a reverse Joule-Thomson effect are hydrogen and helium and mixtures thereof. The advantage of helium is that it is not combustible and will not sustain combustion. Another advantage is that even small leakages of the gas can be detected. The drawback with helium is that it is a relatively expensive gas.

On the other hand, hydrogen is an abundant element and therefore relatively inexpensive. Pure hydrogen gas burns in air and is therefore not suitable for use in its pure form. According to the present invention, there is used a hydrogen-helium mixture having a hydrogen concentration that is below a predetermined value such that the mixture is not ignitable, i.e., will not sustain combustion, if the gas mixture is released into the environment or ambient air.

In addition to the advantage of exhibiting a reverse Joule-Thomson effect, hydrogen and helium are gases which have low molecular weights, which means that they have high outflow velocities in comparison with gases of higher molecular weights. The outflow velocity of hydrogen and helium is approximately three times greater than the outflow velocity of air under corresponding conditions.

It is very important that a pressurized airbag-filling container will not leak in the event of a collision and that the container will maintain the necessary pressure for many years after being filled. Because highly sensitive helium leakage detectors are available, it is convenient for the gas used to contain helium.

I claim:

1. An arrangement for filling a flexible container essentially instantaneously with a gas mixture upon the occurrence of powerful retardation forces, wherein the container upon being filled with the gas mixture functions as a force-absorbing cushion for protection against injury, and wherein the arrangement includes a high-pressure vessel containing a gas mixture consisting essentially of hydrogen and helium, a conduit which connects the pressure vessel to the container, a mechanical opening device for opening the connection between the vessel and the container upon the occurrence of a retardation force which exceeds a smallest value, and a retardation meter, and wherein the gas mixture which fills the flexible container consists essentially of helium and hydrogen.

2. An arrangement according to claim 1, characterized in that the hydrogen concentration of the gas mixture in said vessel is below a predetermined value such that if the gas mixture is released from the vessel and into the ambient air, the released gas mixture is not ignitable.

3. An arrangement according to claim 1, characterized in that the gas mixture contains less than 15 percent by volume hydrogen.

4. An arrangement for filling a flexible container essentially instantaneously with a gas mixture upon the occurrence of powerful retardation forces, wherein the container upon being filled with the gas mixture functions as a force-absorbing cushion for protection against injury, and wherein the arrangement includes:

a high-pressure vessel containing a gas mixture having a reverse Joule Thomson effect comprising hydrogen and helium, a conduit which connects the pressure vessel to the container, a mechanical opening device for opening the connection between the vessel and the container upon the occurrence of a retardation force which exceeds a smallest value, and a retardation meter; and wherein the gas mixture which fills the flexible container upon the occurrence of the retardation force has a reverse Joule Thomson effect.

* * * * *